Figure 1:
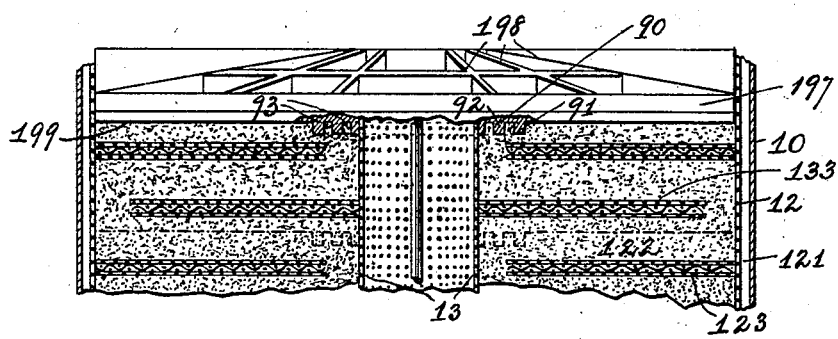

No. 841,652. PATENTED JAN. 15, 1907.
C. H. LOEW.
FILTERING ELEMENT.
APPLICATION FILED NOV. 3, 1906.

Attest:
Herman Meyer
Alan Mc Donnell.

Charles H. Loew, Inventor:
by William R. Baird,
his Atty.

UNITED STATES PATENT OFFICE.

CHARLES H. LOEW, OF LAKEWOOD, OHIO.

FILTERING ELEMENT.

No. 841,652.  Specification of Letters Patent.  Patented Jan. 15, 1907.

Original application filed April 16, 1906, Serial No. 311,880. Divided and this application filed November 3, 1906. Serial No. 341,882.

*To all whom it may concern:*

Be it known that I, CHARLES H. LOEW, a citizen of the United States, residing at Lakewood, in the county of Cuyahoga and State of Ohio, have invented certain new and useful Improvements in Filtering Elements, of which the following is a specification.

My invention relates to the filtering of beer and similar effervescing liquids carrying carbonic-acid gas either in solution or mechanically mixed with the liquid; and its novelty consists in the construction and adaptation of the parts of the filtering elements employed.

In filtering beer and similar gaseous liquids the utmost care is required to prevent the liquids, which are introduced into the filtering apparatus under great pressure, from in any way passing through such apparatus without in all instances passing through a layer of filtering medium sufficiently thick to extract from the incoming column of liquid all of its suspended mechanical impurities. In this art as commonly practiced the filtering medium consists of cellulose either in the form of cotton or similar vegetable fiber or in the form of wood-pulp. The filtering apparatus usually comprises an outer casing or shell provided with suitable inlet and outlet ports and containing within its walls a series of superimposed filter elements arranged either vertically or horizontally, as may be desired, but each element of which is provided with inlet-conductors through which the incoming column of fluid flows and outlet-conductors by means of which it is drained away from the filtering element. These filtering elements are essentially cakes or slabs of compressed cellulose and are either formed *in situ* while the filtering apparatus is being packed or are formed outside of the filtering apparatus and afterward assembled therein in proper order. In either case it sometimes occurs that there is a space between two of the adjacent filtering elements not so tightly packed with the filtering material as the remaining portions of the filter and that the liquid to be filtered creeps into such space and passes through the apparatus without having its mechanical impurities removed.

It is the purpose of my invention to provide a filter element in which such disadvantageous action cannot occur, and I do this by forming the filtering element with a surface compressed into ridges and grooves, so that when the next adjacent or neighboring filtering element is brought into contact therewith the two are interlocked together along the surface of these ridges and grooves, and the liquid to be filtered must pass through the layers of filtering material found in such ridges and grooves before it can escape into the outlet-channels provided for that purpose.

Figure 2:
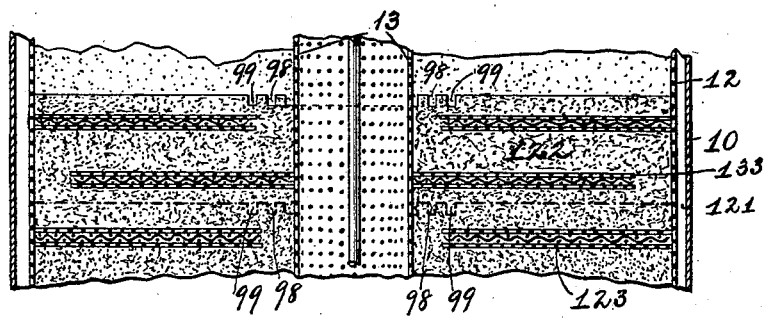

In the drawings, Figure 1 is a vertical central section of a portion of a filtering apparatus, showing the manner of forming my improved filter element; and Fig. 2 is a similar view with the compressing or forming device removed.

In the drawings, 10 represents the cylindrical casing of a filter made of brass or other non-corrodible material and circular in cross-section. Within the casing 10 is placed a crib 12, of woven wire or similar perforated material smaller in diameter than the casing, so that an annular space 121 is formed between them when the crib is centrally located. At the center of the casing is placed a second crib 13, of woven wire or perforated metal and of much smaller diameter than the crib 12. In the space between these two cribs are arranged the filtering elements, each consisting of a mass of wood-pulp or other form of cellulose 122 122, in which are embedded inlet-conductors 123, touching the outer crib 12 and an inner crib 13, and outlet-conductors 133, touching the inner crib 13 and not the outer crib 12. Each conductor comprises a centrally-placed open-work plate made of woven wire or the like, which permits of the free lateral passage of the liquid, and on each side of each plate is arranged a protecting-screen of fine woven wire or cloth.

The filter-casing is mounted upon suitable sectors or in a suitable framework and is provided with a press, the function of which is to compress the pulp *in situ*. This press comprises a plate 197, having reinforcing-ribs 198 and a lower perforated surface 199. It is suitably supported and provided with mechanism whereby it may be lowered into the filter-casing and forced down upon the pulp in such a manner as to compress the latter. The lower perforated surface of the plate constitutes a drainage-surface, through which the water expressed from the pulp may be removed. A press-ring 90 is centrally secured to or made integral with the press-plate 199.

It comprises a plurality of annular flanges 91 and 92, between which are annular grooves 93 93, so that when the pulp has been compressed, as best shown in Fig. 2, it leaves annular grooves 98 and 99 therein, and these grooves being filled with the fresh pulp placed within the apparatus for the purpose of forming a new filter layer above the same serve to felt or mat the parts together to form a seal the better to prevent the escape of the fluid to be filtered. In the drawings there is shown in dotted outline the manner in which the grooves formed in the lower layer of pulp have been filled with the pulp from the upper layer.

It will be understood that in preparing the filter for use the two cribs 12 and 13 are first placed within the casing. A layer of filtering material is then introduced at the bottom of the casing and compressed by means of the press. An inlet or outlet conductor, as the case may be, is then placed on top of the compressed pulp. Fresh pulp is introduced and is again compressed. A second conductor is then introduced and more pulp placed on top of it, and this layer of pulp is again compressed, and so on until the filter is filled.

It will be understood that the filtering apparatus, the filter-press, and the operative mechanism connected to these different parts all form the subject-matter either of prior patents issued to myself or of copending applications.

This application is by a requirement of the Patent Office divided out of application for Letters Patent made by me, Serial No. 311,880, filed April 16, 1906.

What I claim as new is—

1. In a filter adapted for the filtration of beer and similar liquids, a filter element comprising a layer of compressed cellulose and an inlet-conductor embedded therein, said layer having its upper surface compressed into ridges and grooves.

2. In a filter adapted for the filtration of beer and similar liquids, a filter element comprising a layer of compressed cellulose and an outlet-conductor embedded therein, said layer having its upper surface compressed into ridges and grooves.

3. In a filter adapted for the filtration of beer and similar liquids, a series of superimposed filter elements, each comprising a layer of compressed cellulose and each interlocked with its neighbor above and below by a series of ridges and grooves.

In testimony whereof I have affixed my signature in the presence of two witnesses.

CHARLES H. LOEW.

Witnesses:
BERTHA H. BIERMANN,
EMIL O. SAELTZER.